(12) United States Patent
Ho et al.

(10) Patent No.: US 7,462,320 B2
(45) Date of Patent: Dec. 9, 2008

(54) METHOD AND DEVICE FOR DEMOLDING

(75) Inventors: Yu-Lun Ho, Wugu Shiang (TW);
Jen-Hua Wu, Yongjing Shiang (TW);
Wei-Han Wang, Xindian (TW);
Shou-Ren Chen, Taichung (TW);
Lai-Sheng Chen, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 345 days.

(21) Appl. No.: 11/291,853

(22) Filed: Dec. 2, 2005

(65) Prior Publication Data
US 2007/0092594 A1    Apr. 26, 2007

(30) Foreign Application Priority Data
Oct. 25, 2005    (TW) ............................... 94137286 A

(51) Int. Cl.
*B28B 7/10*    (2006.01)
*B29C 43/50*    (2006.01)
(52) U.S. Cl. ..................... 264/334; 425/385; 425/444
(58) Field of Classification Search .............. 425/444, 425/808, 385; 977/887; 264/334
See application file for complete search history.

(56) References Cited

U.S. PATENT DOCUMENTS

| 4,279,586 A | 7/1981 | Yamashita ................. 425/438 |
| 5,358,672 A | 10/1994 | Blum ......................... 264/1.38 |
| 5,599,486 A * | 2/1997 | Fujishiro et al. ........... 264/40.1 |
| 6,416,311 B1 | 7/2002 | Springer et al. ............. 425/385 |
| 2006/0192928 A1* | 8/2006 | Kasumi et al. ................ 355/30 |
| 2007/0018358 A1* | 1/2007 | Heidari et al. .............. 264/334 |

FOREIGN PATENT DOCUMENTS

| CN | 2347413 Y | 11/1999 |
| JP | 06270170 | 9/1994 |
| JP | 2000210951 A | 8/2000 |
| JP | 2001-172788 | 6/2001 |
| JP | 20040066671 | 3/2004 |

* cited by examiner

*Primary Examiner*—Yogendra Gupta
*Assistant Examiner*—Emmanuel S Luk
(74) *Attorney, Agent, or Firm*—WPAT., P.C.; Justin King

(57) ABSTRACT

The present invention relates to a demolding method and device, being used for detaching a mold and a substrate after completing an imprinting process, in which the mold is forced to detach from the substrate partially and form a gap therebetween by inserting at least a blade module between the two, and thus, as air is sucked into the gap and the adhesion force of vacuum effect exerting between the mold and the substrate is eliminated, the blade module is further applied to detach the mold from the substrate completely.

15 Claims, 5 Drawing Sheets

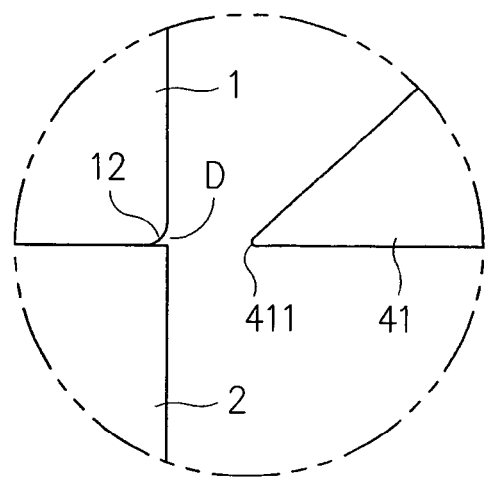
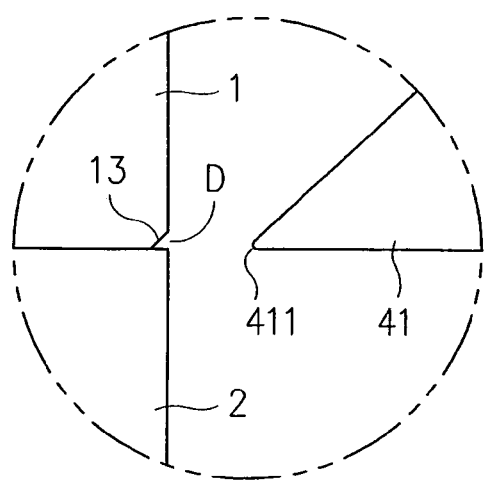
FIG. 2A          FIG. 2B
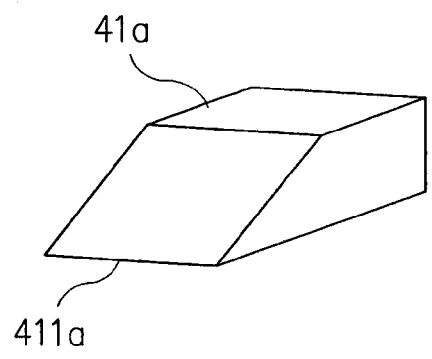
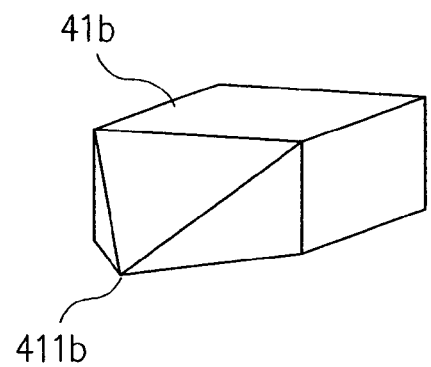
FIG. 3A          FIG. 3B

METHOD AND DEVICE FOR DEMOLDING

FIELD OF THE INVENTION

The present invention relates to a method and device for demolding, and more particularly, to an uncomplicated demolding device and method for separating a mold from a substrate effortlessly.

BACKGROUND OF THE INVENTION

In response to the trend of designing lighter, thinner, and smaller products, more and more related techniques for manufacturing miniature-sized device have becoming available. With respect to the overall advance of manufacturing process, both the top-down process and the bottom-up process are focusing on the development of producing nano-scaled devices. However, although the above focusing had led to the generating of many nano-fabrication techniques, most of which are costly and slow to process that they are not suitable to be applied for mass production.

Take the nanoimprint process for instance, it is a mechanical replication technology for the fabrication of micro- and nanostructures that is similar to photolithography or electron beam lithography, except that a mechanical stamp or mold is used to transfer the pattern to the resist. The nanoimprint process has received considerable interest in the last few years because of the successful demonstration of its potential for a low cost, fast, and high resolution nano lithographic technique, so that the nanoimprint technique has been vastly applied in the manufacturing of many nano-scaled devices, such as electronic devices, optical devices, data storage devices, bio-chips, key components of flat panel display, and so on. However, the current nanoimprint process still can not be applied to mass-produce the aforesaid devices since the yield of any product mass-produced by the current nanoimprint process is poor, whereas the poor yield is caused by improper demolding that damages the imprinted microstructures or cause the polymer of the resist to adhere onto the mold. Moreover, the improper demolding may be caused by the high aspect ratio of the pattern to be imprinted, the shrinkage of the resist, the vacuum generated between the mold and the imprinted resist, the factor of friction/viscosity, and so on.

Form the above description, it is known that except for the friction exerting between imprinted microstructures and the affinity exerting between materials used in the nanoimprint process that can cause the mold to be improperly separated from the resist, the vacuum generated between the mold and the imprinted resist during nanoimprint process can also causing the same, whereas the adhesion force of the vacuum effect is far larger than the referring friction and affinity. Therefore, it is concluded that, in order to complete the demolding smoothly, the primary task is to overcome the adhesion force of vacuum effect.

There are already several prior-art techniques known to be able to overcome the adhesion force of vacuum effect. As a demolding method and device disclosed in U.S. Pat. No. 6,416,311 B1, entitled "DEVICE AND METHOD FOR SEPARATING A SHAPED SUBSTRATE FROM A STAMPING TOOL", the demolding is performed while feeding compressed air through feed ducts formed in the stamping tool so as to overcome the adhesion force of vacuum effect by creating a gap between the stamping tool and the shaped substrate. However, the positioning of the feed ducts on the stamping mold will adversely affect the designs of pattern capable of being formed on the stamping tool, and thus the effective area of the resulting imprinted product is also affected.

Moreover, as disclosed in U.S. Pat. No. 5,358,672, entitled "METHOD FOR DEMOLDING FINISHED ARTICLES FROM GLASS, PLASTIC, OR METALLIC MOLDS", the demolding can be performed by pulling on the extending portion of a tap adhesively bonded to a mold. However, the pulling of the extending portion of the tap not only can adversely affect the effective area of the resulting imprinted product, but also will quality of imprinted patterns formed adjacent to the tap.

Furthermore, as disclosed in J.P Pat. No. 20040066671, the separating of a mold form a substrate is performed by the use of elastic forces provided by the cooperation of a pneumatic cylinder and a plural sets of spring, whereas the plural sets of spring are abutted against the edge portion of the periphery of the mold. However, the demolding mechanism disclosed above is too complicated to be used for demolding in a nanoimprint process whereas the mold and the substrate are almost of the same size.

In addition, as disclosed in J.P Pat. No. 06270170, the mold is first partially detached from the substrate by the deformation of a shape memory alloy caused by the change of temperature as the shape memory alloy is placed against the edge of the mold, and then the mold is separated completely from the substrate as the substrate is restrained by a block as the mold is being lifted to move away from the substrate. However, the demolding requires a specific shape memory alloy designed to cope with the temperature change in the imprinting process, and it also requires a proper block to restrain the substrate, because of which the imprint process is complicated.

From the above description, it is noted that most prior-art demolding methods use a certain means to exert force upon the edge of either the mold or the substrate, which may require uncommon material or complex mechanism for the demolding to be operated smoothly. Moreover, the disposition of those complicated demolding devices usually will cause damage to the effective area of the imprinting and quality thereof.

SUMMARY OF THE INVENTION

In view of the disadvantages of prior art, the primary object of the present invention is to provide an uncomplicated demolding device capable of effortlessly eliminating the adhesion force of vacuum effect exerting between a mold and a substrate during an imprinting process so as to enable the mold to be separated from the substrate smoothly.

To achieve the above object, the present invention provide a method and device for demolding, being used for separating a mold and a substrate after completing an imprinting process, in which the mold is forced to separate from the substrate partially and form a gap therebetween by inserting at least a blade module between the two, and thus, as air is sucked into the gap and the adhesion force of vacuum effect exerting between the mold and the substrate is eliminated, the blade module is further applied to separate the mold from the substrate completely.

In a preferred embodiment of the invention, the demolding device comprises: a substrate, being substantially a resist or a substrate having a layer of resist disposed thereon; a mold with an assembly of micro- or nano-scaled patterns formed thereon; and at least a blade module, for forcing the mold to separate from the substrate partially while forming a gap therebetween by inserting the same between the mold and the substrate; wherein the patterns are duplicated on the resist after the mold being pressed on the resist is removed therefrom.

Preferably, the feature size of each pattern of the assembly formed on the mold is below 100 μm.

Preferably, the blade module further comprises at least a blade module and at least an actuator for driving the blade corresponding thereto to move at any degree of freedom accordingly.

Preferably, the actuator is a vibration actuator, which is capable of generating a vibration for facilitating air to be sucked in the gap while driving the blade to be inserted between the mold and the substrate and separating the two at least partially or completely.

Preferably, the vibration actuator is able to output a signal with non-specific frequency for enabling the vibration of the blade to be applicable for various imprinting processes.

Other aspects and advantages of the present invention will become apparent from the following detailed description, taken in conjunction with the accompanying drawings, illustrating by way of example the principles of the present invention.

BRIEF DESCRIPTION OF THE DRAWINGS

FIG. 2A and FIG. 2B are schematic diagrams showing the edge formations of a mold according to the present invention.

FIG. 3A and FIG. 3B are schematic diagrams showing blades of different shapes according to the present invention.

DESCRIPTION OF THE PREFERRED EMBODIMENT

For your esteemed members of reviewing committee to further understand and recognize the fulfilled functions and structural characteristics of the invention, several preferable embodiments cooperating with detailed description are presented as the follows.

Figure 1A:
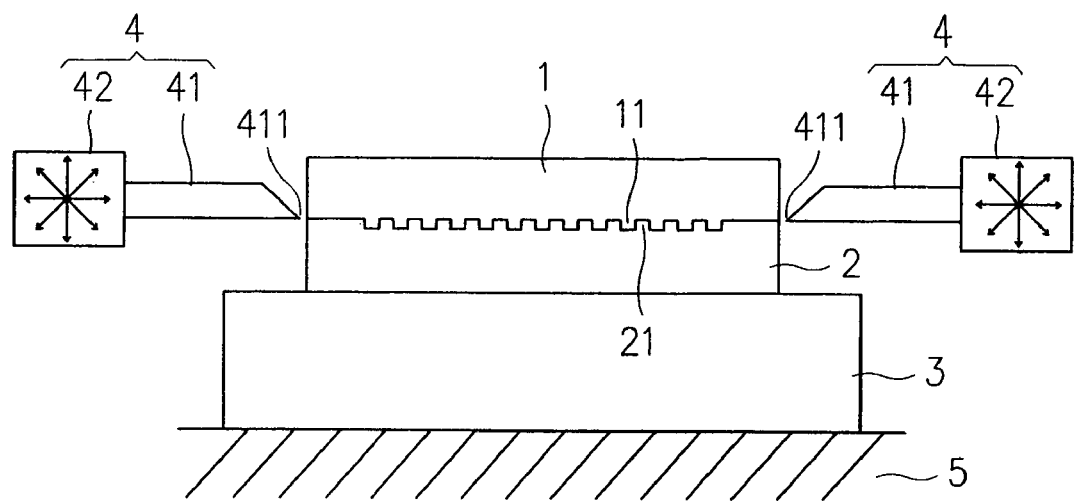
FIG. 1A and FIG. 1B are schematic views of a demolding device according to a first embodiment of the invention.
Figure 1B:
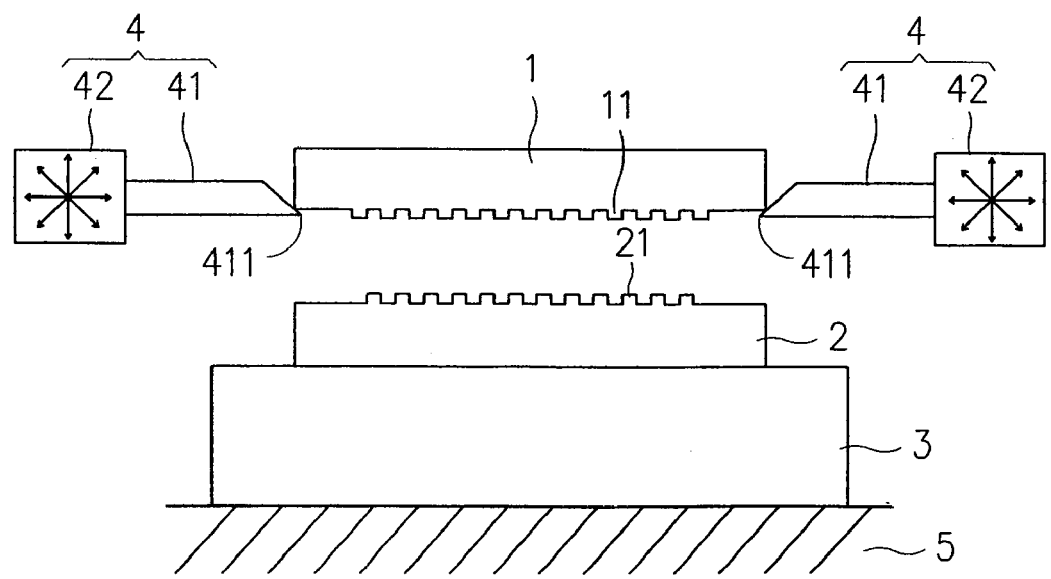

Please refer to FIG. 1A and FIG. 1B, which are schematic views of a demolding device according to a first embodiment of the invention. The demolding device shown in FIG. 1A and FIG. 1B primarily comprises a mold 1, a substrate 2, a supporting plate 3 and at least a blade module 4, wherein at least an assembly of patterns 11 is formed on a surface of the mold 1, whereas the feature size of patterns of the assembly 11, being used in a nanoimprint process, can be below 100 μm; and the substrate 2, substantially being a resist or a substrate having a layer of resist disposed thereon, is used to be pressed by the mold 1 for duplicating the patterns on the resist after the mold 1 is removed therefrom, and the resist is made of a polymer of thermoplasticity; and the supporting plate 3 is used for holding and carrying the substrate 2 and the mold 1, which is generally being placed on a platform 5; and the blade module 4, being arranged outside of the mold 1 and the substrate 2, is comprised of: a blade 41 having a sharp tip 411; and an actuator 42 composed of at least a driver, capable of driving the blade 41 to move at any degree of freedom accordingly.

By the demolding device provides above, the mold 1 can be separated from the substrate 2 by a demolding method of the invention, which comprises the steps of:

driving the blade 41 to move by the actuator 42 while inserting the sharp tip 411 of the blade 41 between the mold 1 and the substrate 2 after completing an imprinting process so as to force the mold 1 to separate from the substrate 2 partially and thus form a gap therebetween for sucking in air to eliminate the adhesion force of vacuum effect exerting therebetween;

using the actuator 42 to drive the blade 41 to lift the mold 1 gradually, or using the actuator 42 to drive the blade 41 to pull up the mold 1 directly so as to separate the mold 1 from the substrate 2 completely.

wherein, as air is being sucked in the gap and the adhesion force of vacuum effect exerting between the mold 1 is eliminated, the blade 41 can lift the mold 1 effortlessly by only exerting a minute force thereon.

Please refer to FIG. 2A and FIG. 2B, which are schematic diagrams showing the edge formations of a mold according to the present invention. In FIG. 2A and FIG. 2B, the edge of the mold 1 can be rounded or wedged that forms a rounded edge 12 as shown in FIG. 2A or forms a wedged edge 13 as shown in FIG. 2B. The edge formations shown in FIGS. 2A and 2B are used for facilitating the sharp tip 411 of the blade 41 to be insert between the mold 1 and the substrate 2. Since an expanded area D can be formed at the joint of the mold 1 and the substrate 2 as the mold 1 is pressed onto the substrate 2, the insertion of the sharp tip 411 into the expanded area D for lifting the mold 1 by the blade module 4 thereafter will not damage the mold 1 or the substrate 2 during the inserting and the lifting. Moreover, since either the rounded edge 12 or the wedge edge 13 are all formed at the edge of the mold 11, both of the two will not have affect on the design of imprinted patterns formed on the mold 1, or affect on the patterns to be imprinted on the resist.

Please refer to FIGS. 3A and 3B, which are schematic diagrams showing blades of different shapes according to the present invention. As the sharp tip 411a of the blade 41a shown in FIG. 3A and the sharp tip 411b of the blade 42b shown in FIG. 3B, the shape of the sharp tip of a blade can be various. However, in general, the tip should be tapered for facilitating the inserting of the tip between a mold and a substrate. Nevertheless, the shape of the tip of the invention is not limited by those disclosed above.

Figure 4A:
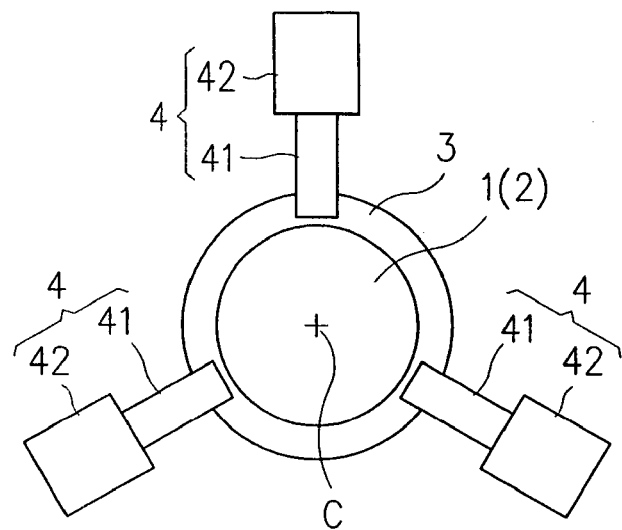
FIG. 4A and FIG. 4B are schematic diagrams showing various arrangements of blade module according to the present invention.
Figure 4B:
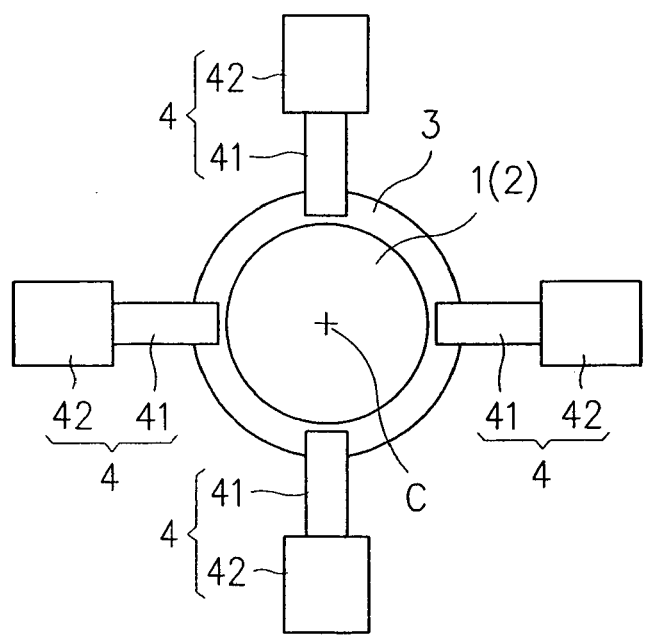

Please refer to FIG. 4A and FIG. 4B, which are schematic diagrams showing various arrangements of blade module according to the present invention. As seen, the mold 1, the substrate 2 and the supporting plate 3 are all in a circular form while a plurality of blade modules are arranged outside of the assembly of the three. There are three blade modules in FIG. 4A and there are four blade modules in FIG. 4B, where all the sharp tips 41 are pointed toward the center of the assembly of the mold 1, the substrate 2 and the supporting plate 3. There should be at least a blade module in the demolding device of the invention and the number of blade module can be varied with respect to actual requirement, moreover, a plural blade modules can be operated simultaneously or in a successively batch order for demolding as required by actual need. It is noted that the number of the blade modules is not limited by those disclosed above.

Figure 5A:
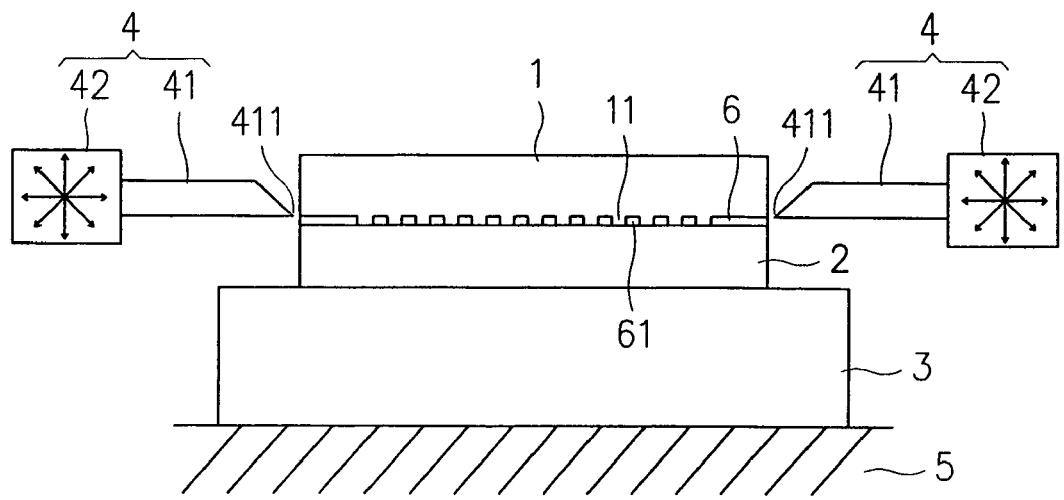
FIG. 5A and FIG. 5B are schematic views of a demolding device according to a second embodiment of the invention.
Figure 5B:
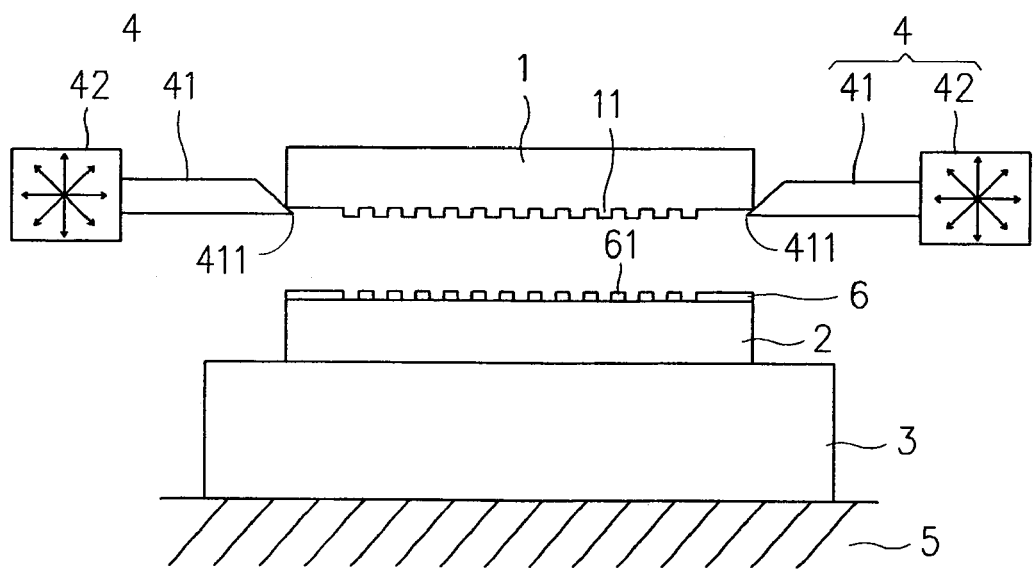

Please refer to FIG. 5A and FIG. 5B, which are schematic views of a demolding device according to a second embodiment of the invention. Instead of the surface of the substrate 2 of the second embodiment is coated with a layer of resist, which can be a polymer of thermoplasticity such as polymethyl methacrylate (PMMA), the mold 1, the substrate 2, the supporting plate 3 and the blade module 4 used in the present embodiment are all the same as those shown in the first embodiment and thus are not described further hereinafter. In the demolding of the second embodiment, the blade 41 is driven to move by the actuator 42 while inserting the sharp tip 411 of the blade 41 between the mold 1 and the substrate 2 after imprinted patterns 61 is formed on the resist layer 6 by the pressing of the mold 1, so that the mold 1 is forced to separate from the substrate 2 partially and thus form a gap therebetween for sucking in air to eliminate the adhesion force of vacuum effect exerting therebetween, and thereafter, the actuator 42 is used to drive the blade 41 to lift the mold 1 gradually, or is used to drive the blade 41 to pull up the mold 1 directly so as to separate the mold 1 from the substrate 2 completely.

Figure 6:
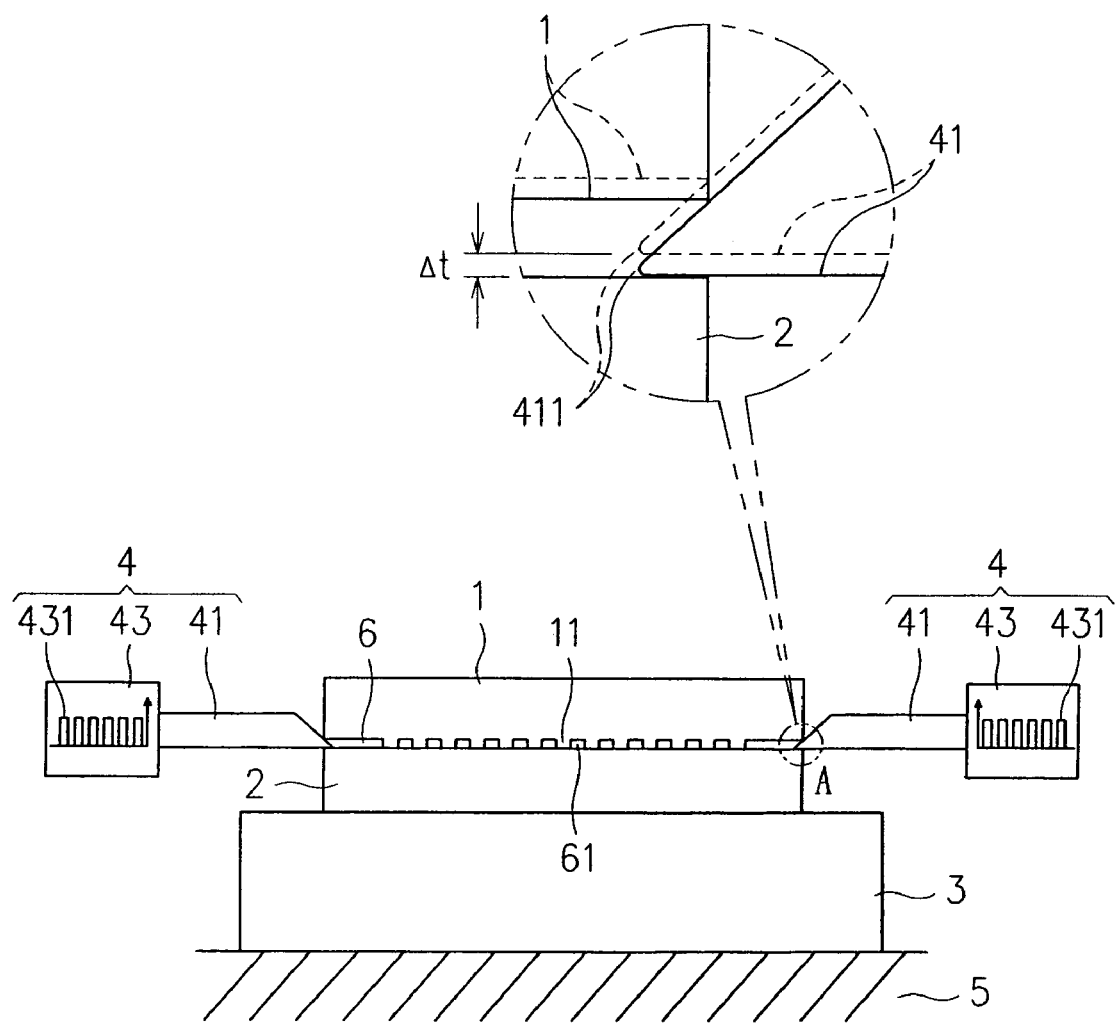
FIG. 6 is a schematic view of a demolding device according to a third embodiment of the invention.

Please refer to FIG. 6, which is a schematic view of a demolding device according to a third embodiment of the invention. Instead of using a vibration actuator 43 for driving the blade 41, all the other component comprised in the third embodiment are the same as those shown in the first embodiment and thus are not described further hereinafter. In this embodiment, as the blade 41 is driven to insert the sharp tip 411 between the mold 1 and the substrate 2, the vibration actuator 43 will issue a signal of non-specific frequency 430 for enabling the blade to vibrate by a minute amount $\Delta t$, whereas the minute amount $\Delta t$ is usually smaller than the thickness of the mold, but is not limited thereby. By the operating of the minute amount $\Delta t$, the outside air can be sucked in the gap between the mold 1 and the substrate and the adhesion force of vacuum effect exerting between the mold 1 is eliminated, so that the mold 1 can be separated from the substrate 2 at least partially.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A demolding device, comprising:
    a mold;
    a substrate, to be pressed by the mold in an imprinting process; and
    at least a blade module, being arranged at a place outside of the mold and the substrate, wherein the blade module further comprises at least a set of a blade and an actuator that is a vibration actuator for issuing a signal of non-specific frequency for enabling the blade to vibrate;
    wherein, at least a portion of each blade module is able to be inserted between the mold and the substrate for forcing the mold to separate from the substrate at least partially.

2. The demolding device of claim 1, wherein at least an assembly of patterns is formed on a surface of the mold and the feature size of patterns is below 100 μm.

3. The demolding device of claim 1, wherein the substrate is substantially a resist for enabling the patterns to be duplicated thereon after the removal of the mold pressed on the substrate.

4. The demolding device of claim 1, wherein the substrate further comprises a layer of resist formed thereon for enabling the patterns to be duplicated on the layer of resist after the removal of the mold pressed on the substrate.

5. The demolding device of claim 1, wherein the actuator is used for driving the blade to move at any degree of freedom accordingly.

6. A demolding method, comprising the steps of:
    inserting a blade of a blade module between a mold and a substrate after completing an imprinting process;
    separating the mold from the substrate at least partially by the use of the blade module, wherein a vibration actuator is used for driving the blade module to separate the mold from the substrate at least partially by issuing a signal of non-specific frequency for enabling the blade to vibrate.

7. The demolding method of claim 6, wherein at least an assembly of patterns is formed on a surface of the mold and the feature size of patterns is below 100 μm.

8. The demolding method of claim 6, wherein the substrate is substantially a resist for enabling the patterns to be duplicated thereon after the removal of the mold pressed on the substrate.

9. The demolding method of claim 6, wherein the substrate further comprises a layer of resist formed thereon for enabling the patterns to be duplicated on the layer of resist after the removal of the mold pressed on the substrate.

10. The demolding method of claim 6, wherein the blade is driven to insert between the mold and the substrate by an actuator.

11. The demolding method of claim 10, wherein the actuator is used for driving the blade to move at any degree of freedom accordingly.

12. A demolding device, comprising:
    a mold;
    a substrate, to be pressed by the mold in an imprinting process; and
    at least a blade module, being arranged at a place outside of the mold and the substrate;
    wherein each blade module further comprises at least a set of a blade and an actuator, wherein the blade module further comprises at least a set of a blade and an actuator that is a vibration actuator for driving the blade to move by issuing a signal of non-specific frequency for enabling the blade to vibrate.

13. The demolding device of claim 12, wherein at least an assembly of patterns is formed on a surface of the mold and the feature size of patterns is below 100 μm.

14. The demolding device of claim 12, wherein the substrate is substantially a resist for enabling the patterns to be duplicated thereon after the removal of the mold pressed on the substrate.

15. The demolding device of claim 12, wherein the substrate further comprises a layer of resist formed thereon for enabling the patterns to be duplicated on the layer of resist after the removal of the mold pressed on the substrate.

* * * * *